US012619196B2

(12) United States Patent
Hernandez

(10) Patent No.: US 12,619,196 B2
(45) Date of Patent: May 5, 2026

(54) MONOLITHIC PART FOR ATTACHING A TIMEPIECE COMPONENT ON A SUPPORT ELEMENT

(71) Applicant: Nivarox-FAR S.A., Le Locle (CH)

(72) Inventor: Ivan Hernandez, Cressier (CH)

(73) Assignee: Nivarox-FAR S.A., Le Locle (CH)

( * ) Notice: Subject to any disclaimer, the term of this patent is extended or adjusted under 35 U.S.C. 154(b) by 212 days.

(21) Appl. No.: 18/500,284

(22) Filed: Nov. 2, 2023

(65) Prior Publication Data

US 2024/0176298 A1 May 30, 2024

(30) Foreign Application Priority Data

Nov. 25, 2022 (EP) .................................... 22209692

(51) Int. Cl.
*G04B 17/34* (2006.01)

(52) U.S. Cl.
CPC .................................... *G04B 17/34* (2013.01)

(58) Field of Classification Search
CPC ................................ G04B 17/32; G04B 17/34
See application file for complete search history.

(56) References Cited

U.S. PATENT DOCUMENTS

| | | | | |
|---|---|---|---|---|
| 10,365,608 B2 * | 7/2019 | Mertenat | .............. | G04B 13/021 |
| 2009/0135679 A1 * | 5/2009 | Musy | .................. | G04B 43/002 368/177 |
| 2009/0263182 A1 * | 10/2009 | Bannier | ................. | G04B 35/00 29/893.2 |
| 2013/0047437 A1 * | 2/2013 | Daout | .................. | G04B 17/345 403/345 |
| 2015/0023140 A1 * | 1/2015 | Daout | .................... | G04B 1/145 368/177 |
| 2016/0370764 A1 * | 12/2016 | Cusin | ................... | G04B 19/044 |
| 2018/0107162 A1 * | 4/2018 | Hernandez | ........... | G04B 17/345 |
| 2018/0150029 A1 * | 5/2018 | Shibuya | ............... | G04B 13/022 |

(Continued)

FOREIGN PATENT DOCUMENTS

| | | |
|---|---|---|
| CH | 715 664 A2 | 6/2020 |
| CH | 716 511 A2 | 2/2021 |
| EP | 1 705 533 A1 | 9/2006 |

(Continued)

OTHER PUBLICATIONS

Machine Translation of CH715664 (Year: 2020).*

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

An attachment monolithic part for fastening a timepiece component on a support element, including an opening into which the support element could be inserted, the attachment part including elastic arms contributing to ensuring an elastic clamping of the support element in the opening, each arm consisting of a contact portion provided with a through hole and with a connecting portion, the contact portion including a receiving region provided with a bearing area intended to come into contact with the support element and the connecting portion ensuring an elastic connection with another one of the arms of the part.

18 Claims, 1 Drawing Sheet

(56) References Cited

U.S. PATENT DOCUMENTS

2022/0075318 A1 3/2022 Hernandez et al.

FOREIGN PATENT DOCUMENTS

| | | | |
|---|---|---|---|
| JP | 2021-32878 | A | 3/2021 |
| JP | 2022-511884 | A | 2/2022 |
| TW | 201734680 | A | 10/2017 |

OTHER PUBLICATIONS

Office Action issued Nov. 5, 2024, in corresponding Japanese Patent Application No. 2023-184166, 7 pages.

European Search Report issued Apr. 18, 2023 in European Application 22209692.7 filed on Nov. 25, 2022, 3 pages (with English Translation of Categories of Cited Documents).

Combined Taiwanese Office Action and Search Report issued Aug. 12, 2024. in corresponding Taiwanese Patent Application No. 112140376 (with English Translation), 19 pages.

* cited by examiner

MONOLITHIC PART FOR ATTACHING A TIMEPIECE COMPONENT ON A SUPPORT ELEMENT

CROSS-REFERENCE TO RELATED APPLICATION

This application claims priority to European Patent Application No. 22209692.7 filed on Nov. 25, 2022, the entire disclosure of which is hereby incorporated herein by reference.

FIELD OF THE INVENTION

The invention relates to an attachment monolithic part such as a collet for fastening a timepiece component on a support element.

The invention also relates to an attachment monolithic part—timepiece component assembly such as a balance spring—collet monolithic assembly.

BACKGROUND OF THE INVENTION

In the prior art, attachment parts such as timepiece collets are known which are involved in assemblies of balance-springs on balance shafts in a horological movement and that being so, by elastic clamping.

Nonetheless, such attachment parts have the major drawback of imposing complex, long and expensive mounting operations, when making such assembly, as these attachment parts have hold torques on these balance shafts that are low and limited.

SUMMARY OF THE INVENTION

The present invention aims to overcome all or part of the aforementioned drawbacks by providing an attachment monolithic part which has a great hold torque in particular to facilitate/simplify the operations of mounting an assembly of an attachment monolithic part—horological component assembly with a support element as well as ensuring enough hold to guarantee holding in position in the plane and guaranteeing its angular position throughout the service life of the component.

To this end, the invention relates to an attachment monolithic part for fastening a timepiece component on a support element, comprising an opening into which said support element could be inserted, the attachment part comprising elastic arms contributing to ensuring an elastic clamping of the support element in the opening, each arm consisting of a contact portion provided with a through hole and with a connecting portion, said contact portion comprising a receiving region provided with a bearing area intended to come into contact with the support element and said connecting portion ensuring an elastic connection with another one of said arms of the part.

In other embodiments:

- the contact portion of each arm is configured so that a variable volume defined by the through hole is reduced when this portion is stressed by the support element;
- each contact portion comprises two lateral regions, the receiving region and an outer region which together surround the through hole;
- said regions are configured to be deformed in different manners as they are stressed by the support element;

- said regions have deformation coefficients whose respective values decrease, as these regions get away from the bearing area of the receiving region;
- the through hole represents between 20 and 80 percents of the entire body of the contact portion of each arm;
- the arms are linked together at one end of their connecting portion;
- the connecting portion is configured to undergo a dual elastic deformation;
- the contact portions and the connecting portions are successively and alternately arranged in the attachment part;
- the attachment monolithic part comprises a point for attachment with the timepiece component;
- the attachment monolithic part is a collet for fastening the timepiece component such as a balance-spring to a support element such as a balance shaft;
- the attachment monolithic part is made of a silicon-based material.

The invention also relates to an attachment monolithic part—timepiece component assembly for a horological movement of a watch comprising such an attachment part.

Advantageously, the assembly is monolithic.

The invention also relates to an assembly for a horological movement of a watch comprising said attachment monolithic part—timepiece component assembly, said assembly being fastened to a support element.

The invention also relates to a horological movement comprising at least one such assembly.

The invention also relates to a watch comprising such a horological movement.

The invention also relates to a method for carrying out such an assembly of an attachment monolithic part—horological component assembly with a support element, comprising:

- a step of inserting the support element into the opening of the attachment monolithic part of said assembly, said step comprising a substep of elastically deforming the attachment monolithic part provided with a phase of moving the elastic arms of the attachment monolithic part imparting an elastic deformation of a contact portion of each arm and a dual elastic deformation of a connecting portion of this arm of the attachment monolithic part, and
- a step of fastening the attachment part on the support element comprising a substep of carrying out a radial elastic clamping of the attachment part on the support element.

BRIEF DESCRIPTION OF THE DRAWINGS

Other particularities and advantages will clearly arise from the following description, made for indicative and non-limiting purposes, with reference to the appended drawings, wherein.

DETAILED DESCRIPTION OF THE PREFERRED EMBODIMENTS

Figure 1:
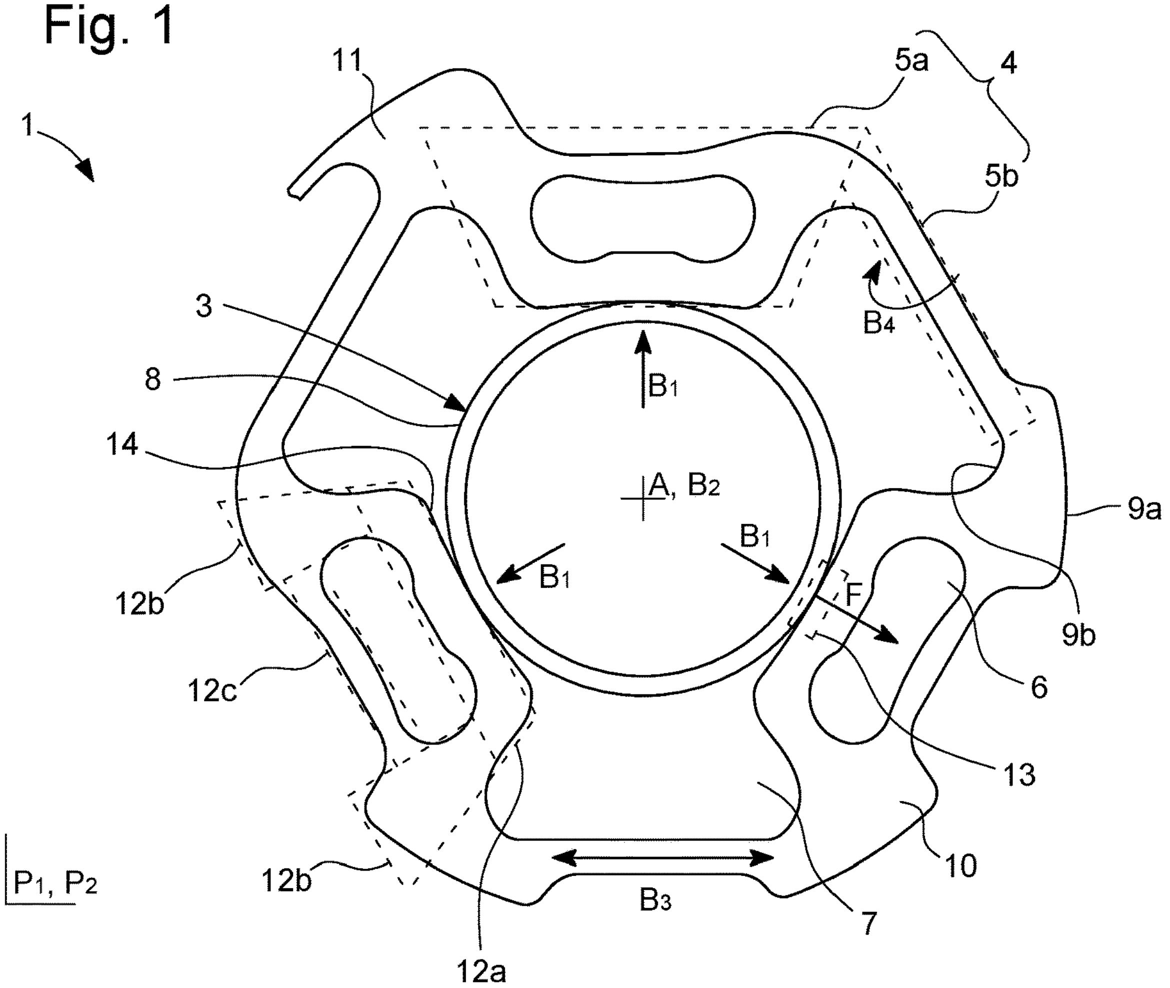
FIG. 1 is a front view of a monolithic part for attaching a horological component on a support element, according to an embodiment of the invention.
Figure 2:
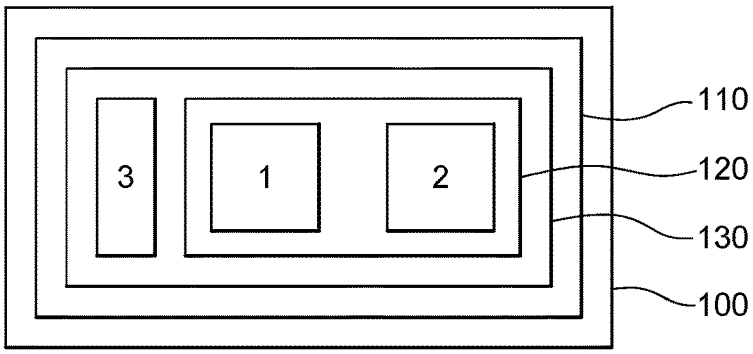
FIG. 2 shows a watch comprising a horological movement provided with at least one assembly including an attachment monolithic part—horological component assembly fastened to a support element, according to an embodiment of the invention.

FIGS. 1 and 2 show an embodiment of the attachment monolithic part 1 of a timepiece component 2 allowing ensuring fastening thereof, mounting thereof, assembly thereof on a support element 3. For example, this attachment monolithic part 1 may be a collet contributing to fastening of the timepiece component 2 such as a balance-spring, to a support element 3 such as a balance shaft.

In this embodiment, this attachment monolithic part 1 also called attachment part 1 may be included in an attachment part—timepiece component assembly 120 visible in FIG. 2 and which is intended to be arranged in a horological movement 110 of a watch 100. Such an assembly 120 may be monolithic and made of a so-called "fragile" material, preferably a micro-machinable material. Such a material may comprise silicon, quartz, corundum or ceramic.

In the context of the invention, this attachment part 1 has a thickness comprised between 50 and 150 μm. Preferably, such a thickness is in the range of 100 μm.

It should be noted that in one variant of this assembly 120, only the attachment part 1 may be made of such a so-called "fragile" material, the horological component 2 then being manufactured in another material.

This assembly 120 may be part of an assembly 130 for the horological movement 110, by being fastened to the support element 3 for example by elastic clamping. It should be noted that this assembly 130 has been imagined for applications in the watchmaking industry. Nonetheless, the invention could perfectly be implemented in other domains such as aeronautics, jewellery, or the automotive industry.

Such an attachment part 1 comprises an upper face and a lower face 10, preferably planar, respectively included in first and second planes P1 and P2 visible in FIG. 1 which are parallel to each other.

This attachment part 1 comprises outer and inner peripheral walls 9*a*, 9*b*. The outer peripheral wall 9*a* comprises a surface which externally delimits the contour of this attachment part 1. This peripheral wall confers an essentially hexagonal shape on this attachment part 1. As regards the inner peripheral wall 9*b*, it comprises a surface which delimits the opening 7 of this attachment part 1. This opening 7 defines a volume in the attachment part 1 which is smaller than that of a connecting portion of one end of the support element 3 which is intended to be arranged therein. It should be noted that this connecting portion has a circular cross-section and comprises all or part of the contact portions defined over the peripheral wall 8 of the support element 3.

As we will see later on, this inner peripheral wall 9*b* comprises bearing areas 13 intended to come into contact on the support element 3.

Referring to FIG. 1, the attachment part 1 comprises elastic arms 4 herein three arms 4. Each arm 4 of this part is configured to recover its original shape after having been deformed. In other words, each elastic arm 4 is reversibly deformable.

Such arms 4 are formed by two portions 5*a*, 5*b*, a first portion so-called contact portion 5*a* with the support element and a second portion so-called elastic connection portion 5*b* with another arm 4 of the attachment part 1.

The contact portion 5*a* of each arm 4 is formed by two lateral regions 12*b*, a receiving region 12*a* and an outer region 12*c*. These regions 12*a* to 12*c* together delimit the periphery of a through hole 6 of this portion 5*a*.

In this configuration, the receiving region 12*a* is comprised between the inner peripheral wall 9*b* of the attachment part 1 and a portion of the periphery of the through hole 6 while being connected to the two lateral regions 12*b* of this contact portion 5*a*. This receiving region 12*a* is provided with an inner face 14 comprising the bearing area 13 of each elastic arm 4. This inner face 14 is formed by a portion of the inner peripheral wall 9*b* which is comprised in this contact portion 5*a* of the arm 4. In this configuration, the bearing area 13 may have:

- a rounded or convex surface arranged between two hollow or concave portions of the inner face 14, or
- a planar or essentially planar surface.

This bearing area 13 comprises a substantially hollow or substantially concave portion in which two contact areas are included. These two contact areas are able to cooperate with the corresponding convex contact portion of the support element 3. Such contact areas are defined/comprised in the surface of this bearing area 13 while extending substantially over all or part of the thickness of the attachment part 1. In addition, these contact areas are flat each comprising a surface that is completely or partially planar. In the bearing area 13, the two contact areas are respectively included in different planes forming together an obtuse angle. These two contact areas are separate by being spaced apart from each other. In other words, the bearing area 13 comprises a connection area of the two contact areas. Preferably, this connection area has a rounded shape.

In particular, these contact areas are intended to cooperate with the contact portions according to a plane-convex or plane-cylinder type contact configuration when considering the cylindrical shape of the support element 3. In this configuration, the planar surface of each contact area cooperates with the convex-shaped corresponding contact portion of the support element 3. It should be pointed out herein that this convex shape of each contact portion 10 is assessed with respect to the planar surface of each corresponding contact area opposite which this portion 10 is arranged. It should be noted that this planar surface of each contact area forms a plane tangent to the diameter of the support element 3. In other words, the planar surface is perpendicular to the diameter and therefore to the radius of the support element.

In this configuration, the presence of two flat contact areas in each bearing area 13 of the attachment part 1 allows performing a contact pressure between this attachment part 1 and the support element 3 when making a mechanical connection therebetween and that being so, while considerably reducing the intensity of the stresses at these contact areas and the corresponding contact portions of the support element 3 during assembly and/or fastening of this attachment part 1 with the support element 3, which stresses being likely to damage the attachment part 1 by apparition of breakups/fractures or cracks.

In this configuration, the presence of this bearing area 13 in the inner face 8 of each contact portion 5*a* allows performing a contact pressure between the attachment part 1 and the support element 3 when making a mechanical connection therebetween and that being so, while considerably reducing the intensity of stresses at this bearing area 13 and the corresponding contact portion of the support element 3 during the assembly and/or fastening of this part 1 with the support element 3, which stresses are likely to damage said attachment part by the apparition of breakups/fractures or cracks.

As we have seen, these contact portions 5*a* therefore comprise the only bearing areas 13 of the attachment part 1 with the support element 3 which may be defined in all or part of the inner faces of these contact portions 5*a*. Referring to FIG. 1, these bearing areas are three in number and may contribute to the achievement of an accurate centring of the timepiece component 2, for example a balance-spring, in the horological movement 110.

Each contact portion 5*a* also comprises an outer region 12*c*. This region 12*c* is comprised between the outer peripheral wall 9*a* of the attachment part 1 and a portion of the periphery of the through hole 6 while also being connected to the two lateral regions 12*b*.

This contact portion 5*a* also includes the two lateral regions 12*b*, each being comprised between one end of an elastic connecting portion 5*b*, a portion of the outer peripheral wall 9*a* and a portion of the periphery of the through hole 6. It should be noted that these two lateral regions 12*b* also connect the receiving 12*a* and outer 12*c* regions together.

In this attachment part 1, the contact portion 5*a* of each arm 4 therefore comprises the through hole 6, also called hollow, which is defined across the thickness of this attachment part 1. This through hole 6 opens into both the upper and lower faces 10 of the attachment part 1. One could also say that this through hole 6 opens at one end into the upper face of the contact portion 5*a* and at another end into the lower face 10 of this portion 5*a*. This hole 6 extends according to the direction of the axis of revolution A and that being so, from the upper face towards the lower face 10 or vice versa. In other words, this through hole 6 connects these two faces together. This through hole 6 defines an empty volume or a matter-free volume. Hence, it should be understood that this volume corresponds to a variable or configurable volume. This volume comprises an open enclosure delimited by a peripheral wall of this hole 6. Such a through hole 6 represents between about 20 and 80 percents of the body of the contact portion 5*a* of the arm 4. Preferably, this through hole 6 represents 30 percents of this body.

Under these conditions, it should be noted that each contact portion 5*a* is configured to modify the volume defined by this through hole when this contact portion 5*a* is stressed by the support element 3.

As we have mentioned before, each arm 4 is further made up of the contact portion 5*a*, of the elastic connecting portion 5*b*. This connecting portion 5*b* allows connecting each arm 4 together and in particular the contact portions 5*a* of these arms 4. This connecting portion 5*b* has an elongate shape and therefore connects the contact portions 5*a* together. In other words, this connecting portion 5*b* extends longitudinally between two contact portions 5*a*.

The connecting portion 5*b* of each arm 4 has a cross-section which is constant or substantially constant all over the body of this elastic arm 4 while the cross-section of the contact portion 5*a* of this arm 4 is not constant/variable.

This connecting portion 5*b* is configured to achieve a dual deformation, a first deformation so-called "torsion elastic deformation" and a second deformation so-called "tensile deformation" or "extension elastic deformation".

During this first deformation, the connecting portion 5*b* of each arm 4 is driven at both of its ends according to the same direction of rotation B4 by the moving contact portions 5*a*, to which portions 5*a* such ends are connected. One could notice that only one portion of the body of the connecting portion 5*b* is deformable in torsion, herein the ends of this portion 5*b*. In particular, such a first deformation contributes in improving the insertion of the support element 3 into the opening 5 of the attachment part 1 while contributing to avoiding any breakup of this part 1 and/or any apparition of a crack in this part 1 upon assembly thereof with the support element 3.

During the second deformation, the connecting portion 5*b* of each arm 4 is pulled at both of its ends according to the longitudinal direction B3 in opposite directions by the moving contact portions 5*a*, to which portions 5*a* such ends are connected. In particular, such a second deformation contributes to making the attachment part 1 store a large amount of elastic energy.

It should be noted that the first and second elastic deformations of the connecting portions 5*b* of these arms 4 may be carried out simultaneously or substantially simultaneously, or successively or substantially successively. It should be noted that when the first and second deformations are carried out simultaneously, then this is referred to as toroidal torsion deformation coupled with a radial expansion.

As mentioned before, the attachment part 1 comprises several elastic arms 4, in particular three in the embodiment that is described herein. In other words, this attachment part 1 comprises three receiving regions 12*a* comprising the bearing areas 13 intended to come into contact with said support element 3 at its corresponding contact portions. These bearing areas 13 are arranged over the periphery of the opening 7 of this attachment part 1. Each of these receiving areas 12*a* and therefore of the bearing areas 13, is configured to carry out a radial movement relative to the axis of revolution A of the body of the attachment part 1 while causing a reduction in the volume defined by the through hole 6, the thickness of this body when said contact portion 5*a* is stressed by the support element 3.

Moreover, in each contact portion 5*a*, the two lateral regions 12*b*, the receiving region 12*a* and the outer region 12*c* border/surround/delimit the through hole 6. More specifically, these regions 12*a* to 12*c* are configured to be deformed in different manners as they are stressed by insertion of the support element 3 into the opening 7 of said part 1. Indeed, for each contact portion 5*a*, each of these regions 12*a* to 12*c* has a deformation coefficient $C_{rr}$, $C_{rl}$, $C_{re}$ whose value decreases, as this region 12*a*, 12*b*, 12*c* is brought away from the bearing area 13 of the receiving region 12*a*. In other words, the deformation coefficient $C_{rr}$, also called deformation average coefficient $C_{rr}$ of the receiving region 12*a* has a high value or a higher value than the value of the coefficient $C_{rl}$ of the two lateral regions 12*b* and of that of the coefficient $C_{re}$ of the outer region 12*c*. In addition, the coefficients Cri of the two lateral regions 12*b* have similar or substantially similar values which are higher than that of the coefficient $C_{re}$ of the outer region 12*c*. In other words, the relationship between these deformation average coefficients $C_{rr}$, $C_{rl}$, and $C_{re}$ of these regions 12*a*, 12*b*, 12*c* may be defined according to the following mathematical formula:

$$C_{rr}>C_{rl}>C_{re}$$

It should be noted that the deformations of these regions 12*a*, 12*b*, 12*c* cause a radial movement relative to the axis of revolution A of each of them. Of course, the amplitude/the intensity of these radial movements depend on the average deformation coefficients $C_{rr}$, $C_{rl}$, $C_{re}$ of these regions 12*a*, 12*b*, 12*c*.

In this configuration, the elasticity or the flexibility of the attachment part 1, is defined by the combination of the deformations of the contact portions 5*a* and of the connecting portions 5*b*, more specifically compared to the intensity of these deformations during the application of a force F on the bearing areas of this part 1.

It should be noted that the through holes 6 of the arms 4 of the attachment part 1 are configured so as to control the movement of the contact portions 5*a*, in particular to reduce this movement, so that these portions 5*a* could, by cooperating with the connecting portions 5*b*, store as much elastic energy as possible when driving the attachment part 1 on the support element 3 and thus increase holding of this part 1 on this element 3.

Such a configuration of the elastic arms 4 enables the attachment part 1 to store a larger amount of elastic energy for the same clamping in comparison with the attachment parts 1 of the prior art. Such an amount of elastic energy stored in this part 1 then allows obtaining a greater holding torque of the attachment part 1 on the support element 3 in the assembly 130 of the attachment part—timepiece component assembly 120 with this support element 3. Complementarily, it should be noted that such a configuration of the attachment part 1 allows storing elastic energy ratios that are 6 to 8 times greater than those of the attachment parts of the prior art.

Furthermore, one could notice that the arrangement of the elastic arms 4 in the attachment part 1 enables, during insertion with clamping, a deformation of each elastic arm 4 allowing accommodating for the deformation of the entire attachment part 1 with the geometry of the connecting portion of the support element 3 on which assembly is done.

Figure 3:
FIG. 3 shows a method for carrying out such an assembly of the attachment monolithic part—horological component assembly with a support element.

Referring to FIG. 3, the invention also relates to a method for carrying out the assembly 130 of the attachment monolithic part—timepiece component assembly 120 with the support element 3. This method comprises a step 20 of inserting the support element 3 into the opening 7 of the attachment part 1. During this step 20, the end of the support element 3 is set at the entrance of the opening 7 defined in the lower face 10 of the attachment part 1 in preparation for the insertion of the connecting portion of this support element 3 into the volume defined in this opening 7. This step 20 comprises a substep 21 of elastic deformation of the attachment part 1 in particular of a central area of this attachment part 1 comprising said opening 7 resulting from the application of a contact force F on the bearing areas 13 of the elastic arms 4 by the contact portions of the peripheral wall 8 of the connecting portion of the support element 3. This elastic deformation of the central area therefore causes a deformation of the lower face 10 of the attachment part 1 which then features an essentially concave shape in particular a portion of this lower face 10 comprised in the central area of the attachment part 1. In other words, when the central area of the attachment part 1 is deformed, this lower face 10 is no longer planar and is then no longer entirely comprised in the second plane P2.

As we have described before, this elastic deformation of the attachment part 1 results from the application of the contact force F on the bearing areas 13 of the elastic arms 4 by the contact portions of the peripheral wall 8 of the support element 3. Such a deformation substep 21 comprises a phase 22 of moving the elastic arms 4, and in particular the contact portions 5*a*, by the action of the contact force F applied thereon. Such a movement of the elastic arms 4 is carried out according to a direction comprised between a radial direction B1 relative to an axis of revolution A common to the support element 3 and to the attachment part, and a direction B2 coincident with this axis A. It should be noted that this direction B2 is perpendicular to the direction B1 and is oriented according to a way defined from the lower face 10 towards the upper face. Preferably, the contact force F is perpendicular or substantially perpendicular to said bearing area 13. It should be noted that in the context of the implementation of the deformation substep, each elastic arm 4 is subjected to a triple deformation, a deformation of its contact portion 5*a* and a dual deformation of its connecting portion 5*b*. This triple elastic deformation is carried out simultaneously or successively.

Afterwards, this method comprises as step 23 of fastening the attachment part 1 on the reinforcing element 3. Such a fastening step 23, in particular by radial elastic clamping, comprises a substep 24 of carrying out a radial elastic clamping of the attachment part 1 on the support element 3. Hence, it should be understood that in such a stressed state, the attachment part 1 stores a large amount of elastic energy which contribute to conferring thereon a considerable holding torque enabling in particular an optimum pinning up by elastic clamping.

The invention claimed is:

1. An attachment monolithic part for fastening a timepiece component on a support element, the attachment monolithic part comprising:

- an opening into which said support element can be inserted, and
- elastic arms to provide an elastic clamping of the support element in the opening,
- each arm consisting of a contact portion provided with a single through hole and with a connecting portion, said contact portion comprising a receiving region provided with a bearing area to come into contact with the support element and said connecting portion ensuring an elastic connection with another one of said arms of the part, wherein the connecting portion of each elastic arm extends longitudinally between two contact portions and has a cross-section that is constant.

2. The attachment monolithic part according to claim 1, wherein the contact portion of each arm is configured so that a variable volume defined by the single through hole is reduced when said portion is stressed by the support element.

3. The attachment monolithic part according to claim 1, wherein each contact portion comprises two lateral regions, the receiving region, and an outer region, which together surround the single through hole.

4. The attachment monolithic part according to claim 3, wherein each particular region of the receiving region, the two lateral regions, and the outer region is configured to be deformed in a respectively different manner as the particular region is stressed by the support element.

5. The attachment monolithic part according to claim 1, wherein each contact portion comprises two lateral regions, the receiving region, and an outer region, which together surround the single through hole, each particular region of said regions having a respective deformation coefficient whose value decreases, as the particular region moves away from the bearing area of the receiving region.

6. The attachment monolithic part according to claim 1, wherein the single through hole represents between 20 and 80 percent of an entirety of the contact portion of each arm.

7. The attachment monolithic part according to claim 1, wherein the arms are linked together at one end of respective connecting portions.

8. The attachment monolithic part according to claim 1, wherein the connecting portion is configured to undergo a torsion elastic deformation and a tensile deformation.

9. The attachment monolithic part according to claim 1, wherein the contact portions and the connecting portions are successively and alternately arranged in the attachment monolithic part.

10. The attachment monolithic part according to claim 1, further comprising a point for attachment with the timepiece component.

11. The attachment monolithic part according to claim 1, wherein said attachment monolithic part is a collet to fasten the timepiece component to the support element.

12. The attachment monolithic part according to claim 1, wherein said attachment monolithic part is made of a silicon-based material.

13. An attachment monolithic part-timepiece component assembly for a horological movement of a watch, the attachment monolithic part-timepiece component assembly comprising the attachment monolithic part according to claim 1.

14. The assembly according to claim 13, wherein the attachment monolithic part-timepiece component assembly is monolithic.

15. An assembly for a horological movement of a watch comprising the attachment monolithic part-timepiece component assembly according to claim 13, said assembly being fastened to the support element.

16. A horological movement comprising the assembly according to claim 15.

17. A watch comprising the horological movement according to claim 16.

18. A method for making the assembly of the attachment monolithic part—timepiece component assembly with the support element according to claim 17, comprising:

inserting the support element into the opening of the attachment monolithic part of said assembly, the inserting step further comprising elastically deforming the attachment monolithic part provided with a phase of moving the elastic arms of the attachment monolithic part imparting an elastic deformation of the contact portion of each arm and a dual elastic deformation of the connecting portion of said arm of the attachment monolithic part, and fastening the attachment part on the support element comprising performing a radial elastic clamping of the attachment part on the support element.

* * * * *